Oct. 18, 1927. 1,645,910
R. JOHNSTON
STANDING BOOM
Filed Aug. 25, 1926 2 Sheets-Sheet 2

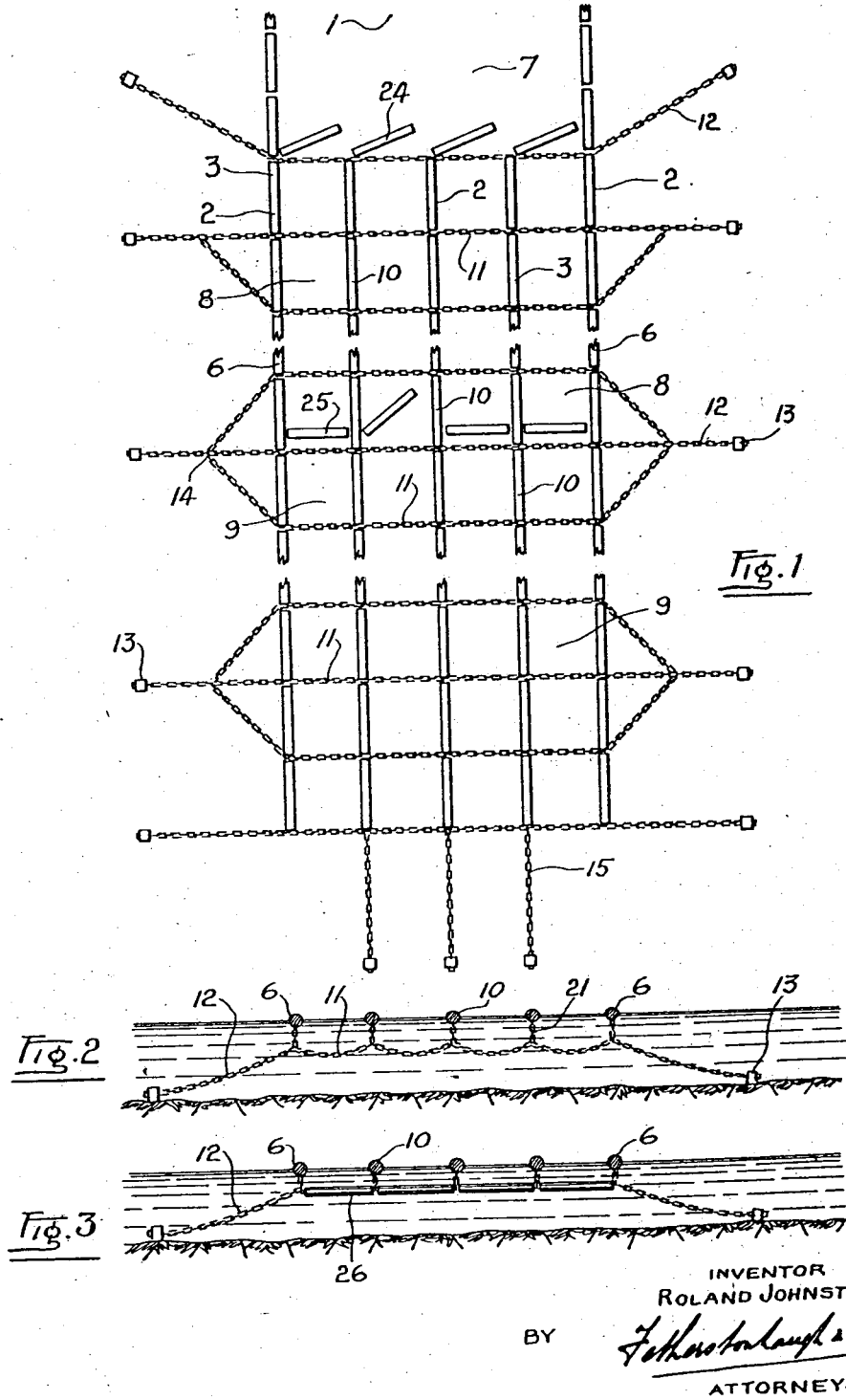

INVENTOR
ROLAND JOHNSTON
BY Featherstonhaugh & Co
ATTORNEYS

Patented Oct. 18, 1927.

1,645,910

UNITED STATES PATENT OFFICE.

ROLAND JOHNSTON, OF VANCOUVER, BRITISH COLUMBIA, CANADA.

STANDING BOOM.

Application filed August 25, 1926. Serial No. 131,513.

My invention relates to improvements in standing booms which are particularly adapted for the purpose of sorting and booming of logs for transportation to the mills, where they are converted into lumber. The objects of the invention are to provide a standing boom which can be secured in place in deep water as easily as in shallow water to avoid the use of piling or other similar structures which are subject to breakage due to currents or the ravages of toredos, and to provide means whereby the pockets comprising the standing boom may be increased or decreased in width to facilitate the removal of log booms formed therein.

The invention consists essentially of a plurality of rows of boom sticks connected together end to end, and side by side in spaced relation to form a series of boom pockets, means for closing the pockets, and means for anchoring the boom sticks to the sea floor, as will be more fully described in the following specification, in which:—

Fig. 1 is a general (broken) plan of the standing boom.

Fig. 2 is a transverse sectional view showing the boom sticks connected together by flexible means.

Fig. 3 is a transverse sectional view showing a modification of the connecting means.

In the drawings like characters of reference indicate corresponding parts in each figure.

Figure 4:
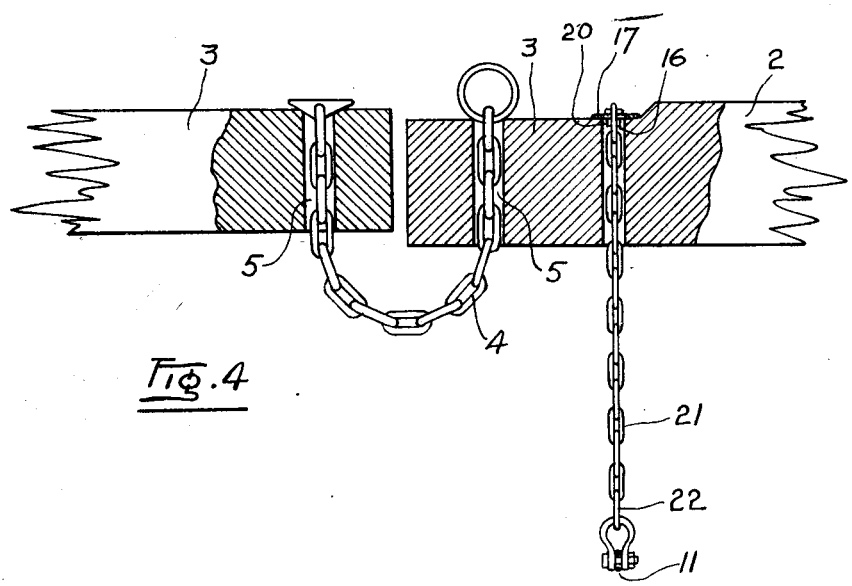
Fig. 4 is a part sectional view of one row of boom sticks showing a trip chain.
Figure 5:
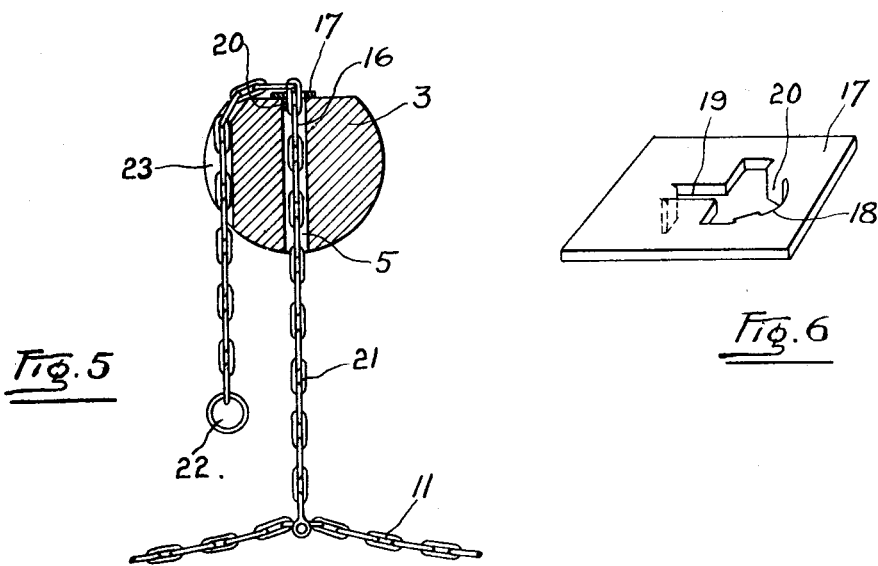
Fig. 5 is a transverse sectional view of the boom stick showing a trip line and a portion of a boom stick connecting line.

The numeral 1 indicates the shore or wharf front from which the logs to be boomed for transportation are discharged into the water. The numeral 2 indicates generally a plurality of booms each of which are formed of a plurality of long logs or boom sticks 3 connected together end to end by boom chains 4, see Figure 4, passing through apertures 5 extending through the logs adjacent their ends. The booms forming the sides of the standing boom are particularly indicated by the numeral 6 and are hereinafter referred to as the side booms. These side booms extend from the wharf line 1 to a distance somewhat in excess of two booms of logs to be transported and enclose, adjacent the wharf line, an area 7 technically known as a receiving or sorting pocket, and other areas numbered 8 and 9 respectively, hereinafter referred to as boom pockets, which boom pockets are separated from each other by intermediate booms 10.

Figure 6:
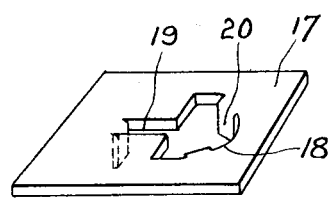
Fig. 6 is an enlarged view of the trip line grab plate.

The numeral 11 indicates a plurality of lines, preferably made up of relatively light chain, jointed rods or cable, which are adapted to extend transversely of the booms 2 at such a depth below the water line as will permit any log being floated over them into any of the pockets. The outer extremities of the underwater lines 11 are extended to form anchor lines 12 and are suitably anchored to the sea floor as at 13. Where the water is deep I may prefer to connect some of the anchor lines together, as shown in Figure 1 at 14, to reduce the quantity of anchor line to a minimum. If the standing boom is adapted to stand in tidal waters where the current is strong, I may prefer to provide additional anchorages 15 extending longitudinally from the outer end of one or more of the booms 2. The logs 3 forming the booms are provided with apertures 16, see Figure 4, adjacent one end and into each of these a grab plate see Figure 6, generally indicated by the numeral 17 is fitted. The grab plates are formed from a piece of sheet metal pierced to form a semi-circular aperture 18 having a slot 19 extending outwardly from its cord and extending inwardly from the aperture are tongues 20 which are downwardly bent to project below the plate, which are adapted to engage the sides of the apertures 16 of the logs 3 to prevent its displacement.

The numeral 21 indicates a trip chain which is provided with a ring or toggle 22 at one end, the chain being passed downward through the grab plate 17 and the aperture 16 of each of the boom logs 3 and connected to the under water lines 11. This chain is adapted to pass freely through the semi-circular portion 18 of the aperture in the grab plate and to have any one of its links slipped into the slot 19 thereof to prevent its longitudinal movement therethrough. As a means of preventing the chains 21 from being disturbed by the rubbing action of a boom of logs floating within any of the pockets, a groove 23 is formed in the side of each boom log 3 adjacent the aperture 16 in which a portion of the free end of the chain 21 may rest.

The pockets 8 are separated from the sorting pockets 7 by gates 24, each consisting of a pole which is hingingly connected by a chain to a boom 2 on one side of a pocket 8, adapted to be detachably connected to another boom on the opposite side of the said pocket, so that the gate may be opened and saw logs floated from the sorting pocket 7 into the longitudinal pocket. Similar gates 25 are provided between the booms intermediate their length.

In the modification shown in Figure 3, the numeral 26 indicates a plurality of substantially rigid members such as water logged poles, in the place of the flexible under water lines 11, which maintain the booms 2 at a predetermined separation.

Having thus described the several parts of my invention I will now briefly explain its use.

Saw logs are first deposited into the pocket 7 and the gates 24 of such pockets 8 are opened and the logs selected and floated into the different pockets 8, where they are stored until a sufficient number of any particular species or grade has been accumulated to make up a boom, when the intermediate gate 25 is opened and the logs moved therethrough into the adjoining pocket 9 where they are made up into a boom ready for transportation, where the boom is held pending the arrival of the tug which is to tow it to the sawmill or market.

Should the boom of saw logs be wide enough to substantially fill up the width of its pocket, so that its endwise movement may be difficult to accomplish, some of the trip lines 11 are slackened so that the booms 2 may have freedom of sidewise movement whereby the width of the pocket may be increased to facilitate the removal of the boom of logs to the open water.

It will thus be seen that I have invented a standing boom which can be conveniently held in any desired position irrespective of the depth or movement of water, without the use of piling or dolphins, and one which is capable of such distortion as will permit of the free handling of booms of saw logs therein.

What I claim as my invention is:

1. A standing boom comprising a pair of parallel floatable members adapted to extend outwards from a wharf or shore line between which a plurality of logs are adapted to be boomed for transportation, means for anchoring the members to the sea floor, and underwater means for connecting the members together.

2. A standing boom comprising a pair of parallel floatable members adapted to extend outwards from a wharf or shore line, between which a plurality of logs are adapted to be boomed for transportation, means for anchoring the members to the sea floor, and flexible members extending below the water level from one parallel member to the other.

3. A standing boom comprising a pair of floatable members formed of logs connected together end to end and adapted to extend outwardly from a wharf or shore line, transverse members extending intermediate the length of the floatable members defining between them and the wharf or shore line a transverse pocket, logs extending outwardly from the transverse members parallel to the floatable members forming a plurality of longitudinal pockets, underwater means connecting the parallel members together, and means permitting the displacement of one of the first named transverse members to afford access to one of the longitudinal pockets.

4. A standing boom comprising a plurality of parallel floatable members spaced apart to form open ended pockets in which saw logs are adapted to be boomed, said members being anchored to the sea floor and flexibly connected to each other, and floatable gates extending between the members to divide the pockets longitudinally.

5. A standing boom comprising a plurality of parallel floatable members adapted to extend outwards from a wharf or shore line and between which saw logs are adapted to be boomed, chains connected to each boom at intervals of the boom length and extending downwardly into the water, the lower ends of one set of chains being connected to the lower end of another set by transverse under water lines, an anchorage for the transverse lines and means for adjusting the length of chain extension.

6. In a standing boom comprising a plurality of parallel floatable members spaced apart and between which saw logs are adapted to be boomed, which floatable members are apertured, means connecting the members comprising underwater lines suspended from chains extending downwards through the apertures in the members, an apertured plate overlying the aperture of each of the members through which a chain may freely pass, the aperture in said plate having a slot somewhat greater in width than the chain material and in which a link is adapted to be set to hold the chain against endwise movement.

Dated at Vancouver, B. C., this 3rd day of August, 1926.

ROLAND JOHNSTON.